US012608790B2

(12) United States Patent
McCrackin et al.

(10) Patent No.: US 12,608,790 B2
(45) Date of Patent: Apr. 21, 2026

(54) ANALYZING MECHANICAL COMPONENTS

(71) Applicant: Baker Hughes Holdings LLC,
Houston, TX (US)

(72) Inventors: Sheldon McCrackin, Yukon, OK (US);
Yandong Wang, Camillus, NY (US)

(73) Assignee: Baker Hughes Holdings LLC,
Houston, TX (US)

( * ) Notice: Subject to any disclaimer, the term of this
patent is extended or adjusted under 35
U.S.C. 154(b) by 369 days.

(21) Appl. No.: 18/467,086

(22) Filed: Sep. 14, 2023

(65) Prior Publication Data

US 2025/0095136 A1    Mar. 20, 2025

(51) Int. Cl.
 G06T 7/00      (2017.01)
 G06T 7/33      (2017.01)
(52) U.S. Cl.
 CPC .............. G06T 7/001 (2013.01); G06T 7/33
 (2017.01); G06T 2207/20212 (2013.01); G06T
 2207/30164 (2013.01)
(58) Field of Classification Search
 CPC . G06T 7/001; G06T 7/33; G06T 2207/20212;
 G06T 2207/30164
 See application file for complete search history.

(56) References Cited

U.S. PATENT DOCUMENTS

2018/0339720 A1 * 11/2018 Singh ...................... G06T 7/001
2022/0135254 A1    5/2022 Graham et al.
2022/0236197 A1 *  7/2022 Wang ................... F01D 21/003
2023/0264302 A1 *  8/2023 Okuma ................ B23K 9/0956
                                                            382/103

FOREIGN PATENT DOCUMENTS

CN      106141435 A    11/2016
CN      116511727 A     8/2023
JP    2013145202 A *    7/2013
WO    2023-089764 A1    5/2023

OTHER PUBLICATIONS

International Search Report dated Dec. 19, 2024 for International
Application No. PCT/US2024/045565, filed Sep. 6, 2024 (3 pgs).

* cited by examiner

*Primary Examiner* — Stephen R Koziol
*Assistant Examiner* — Michael Kim Maiden
(74) *Attorney, Agent, or Firm* — Mintz, Levin, Cohn,
Ferris, Glovsky and Popeo, P.C.

(57)          ABSTRACT

Data, characterizing a first image and plurality of 3D surface
points characterizing a mechanical component before a
repair has been performed on the mechanical component and
after a repair has been performed on the mechanical com-
ponent, is received. A second set of data is determined based
on combining the received data. The second set of data
characterizes an image and dimensions of the mechanical
component before and after a repair has been performed on
the component. A location of a work area and a size of the
work area before and after the repair has been performed on
the component is determined based on the second set of data.
The second set of data and the determined location and size
of the work area before and after the repair has been
performed on the component.

16 Claims, 7 Drawing Sheets

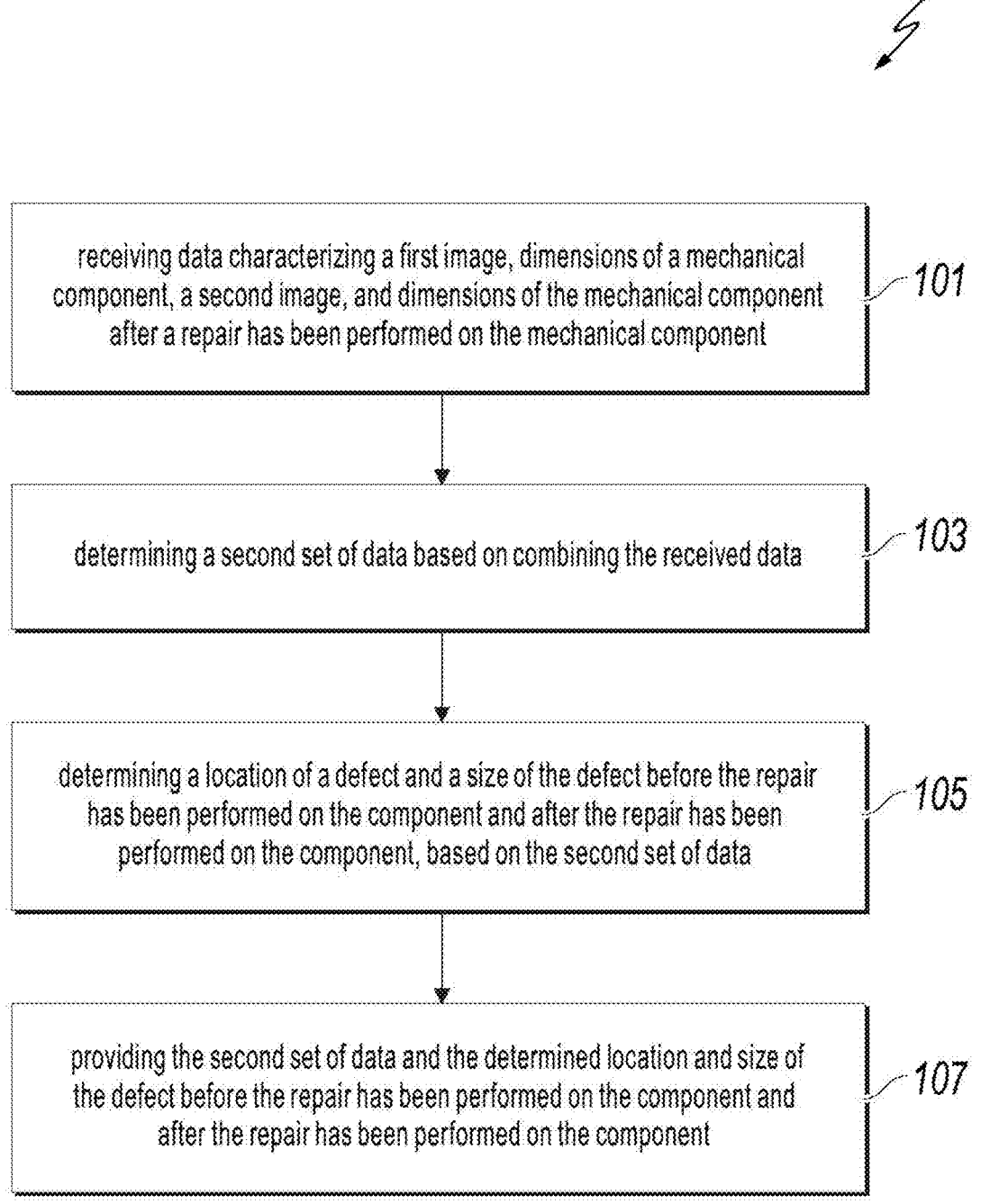

*100* receiving data characterizing a first image, dimensions of a mechanical component, a second image, and dimensions of the mechanical component after a repair has been performed on the mechanical component

*101* determining a second set of data based on combining the received data

*103* determining a location of a defect and a size of the defect before the repair has been performed on the component and after the repair has been performed on the component, based on the second set of data

*105* providing the second set of data and the determined location and size of the defect before the repair has been performed on the component and after the repair has been performed on the component

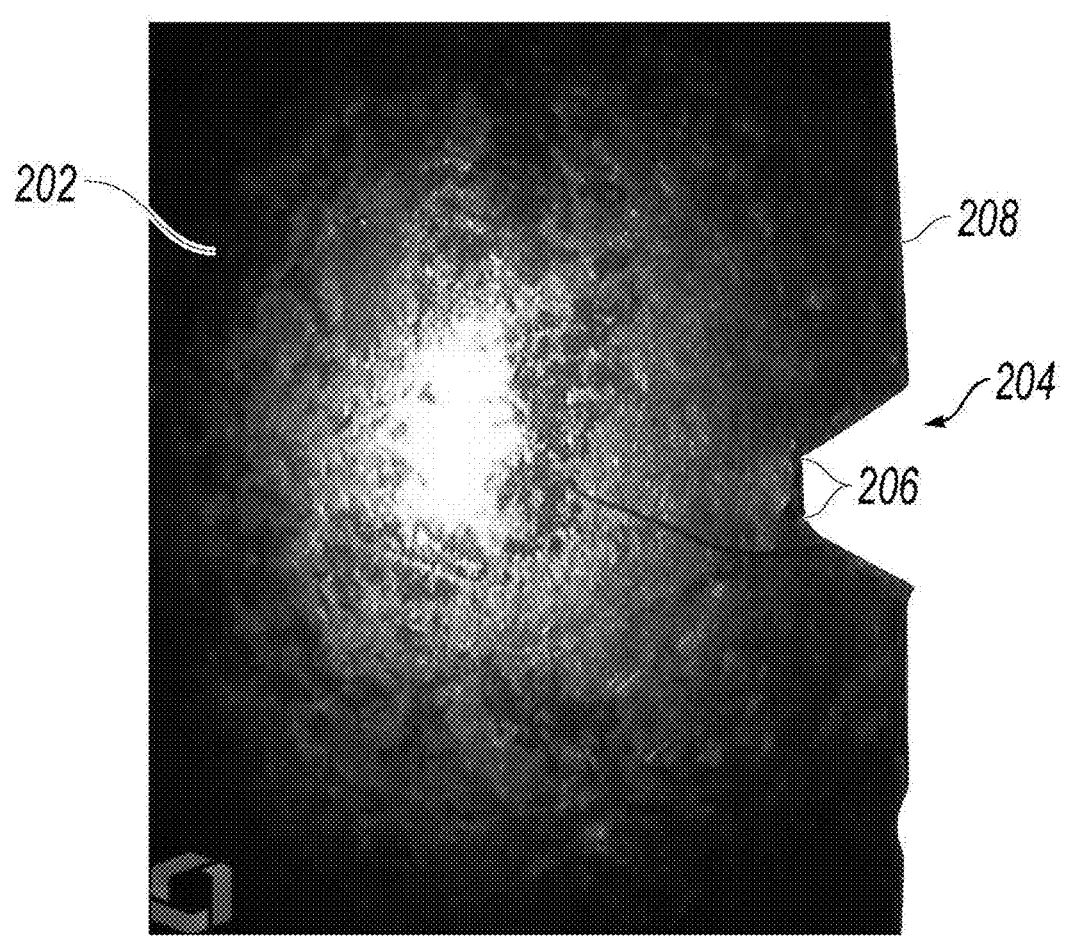
FIG. 2

300

202

308

304

202

First Image  -------------------
Second Image  -------------------

ANALYZING MECHANICAL COMPONENTS

TECHNICAL FIELD

The subject matter described herein relates to analyzing images of a mechanical component before and after a repair operation.

BACKGROUND

Components in static and dynamic systems often require inspection and repair. Such inspections and repairs can be performed with borescope systems. For example, gas turbines are complicated machines that are difficult to take apart and put back together again for inspection. As such, many components, such as compressor and turbine blades, are inspected through small access holes that can be entered by a borescope for inspection. Similarly, repairs are sometimes completed through the same access holes with small tools, some of which can be mounted on a borescope. An example of such a tool is a bore grinder. When inspections and repairs are performed borescopically, inspections can occur before a repair takes place. Such data provided by the initial inspection is generally used to determine the need for a repair and the type of repair performed.

SUMMARY

This disclosure relates to analyzing mechanical components.

An example implementation of the subject matter described within this disclosure is a method with the following features. Data, characterizing a first image and plurality of 3D surface points characterizing a mechanical component before a repair has been performed on the mechanical component and a second image and plurality of 3D surface points characterizing the mechanical component after a repair has been performed on the mechanical component, is received. The repair includes removing material from, or adding material to, the component. The first and second images are acquired using an image sensor, and the 3D surface points characterizing the mechanical component before and after the repair are derived from images acquired using the image sensor A second set of data is determined based on combining the received data. The second set of data characterizes an image and dimensions of the mechanical component before and after a repair has been performed on the component. A location of a work area and a size of the work area before the repair has been performed on the component and after the repair has been performed on the component is determined based on the second set of data. The second set of data and the determined location and size of the work area before the repair has been performed on the component and after the repair has been performed on the component is provided.

The disclosed method can be implemented in a variety of ways. For example, within a system that includes at least one data processor and a non-transitory memory storing instructions for the processor to perform aspects of the method. Alternatively or in addition, the method can be in included non-transitory computer readable memory storing the method as instructions which, when executed by at least one data processor forming part of at least one computing system, causes the at least one data processor to perform operations of the method.

Aspects of the example method, which can be combined with the example method alone or in addition with other aspects, include the following. The mechanical component is repaired.

Aspects of the example method, which can be combined with the example method alone or in addition with other aspects, include the following. The mechanical component includes a turbine blade or a weld.

Aspects of the example method, which can be combined with the example method alone or in addition with other aspects, include the following. Receiving the data includes acquiring the data from a borescope positioned within a mechanical system.

Aspects of the example method, which can be combined with the example method alone or in addition with other aspects, include the following. Determining the second set of data includes determining a 3D transformation to align the mechanical component as characterized by the first plurality of 3D surface points and the mechanical component as characterized by the second plurality of 3D surface points. A first plurality of aligned 3D surface points and a second plurality of aligned 3D surface points are determined using the 3D transformation.

Aspects of the example method, which can be combined with the example method alone or in addition with other aspects, include the following. Determining the second set of data includes the following steps. Features within the first image and the second image are identified. The features are matched between the first image and the second image. A 3D transformation matrix is determined. Determining the first plurality of aligned 3D surface points and the second plurality of aligned 3D surface points using the 3D transformation includes multiplying the 3D transformation matrix with the first or second plurality of 3D surface points. The first image is spatially transformed to align with the second image, producing a transformed image.

Aspects of the example method, which can be combined with the example method alone or in addition with other aspects, include the following. Identifying features within the first image and the second image includes identifying points indicative of the work area. Determining the location and the size includes identifying features indicative of edges of the mechanical component, and measuring a distance between the features indicative of the work area and the features indicative of the edges of the mechanical component.

Aspects of the example method, which can be combined with the example method alone or in addition with other aspects, include the following. Measuring a distance includes measuring multiple of distances. The method further includes the following features. The measured distances are compared between the mechanical component before the repair and the mechanical component after repair. An amount of material is determined to have been added or removed during the repair based on the comparison. The determined amount of material added or removed is provided.

Aspects of the example method, which can be combined with the example method alone or in addition with other aspects, include the following. Providing the second set of data and the determined location and size includes displaying an image.

BRIEF DESCRIPTION OF THE FIGURES

These and other features will be more readily understood from the following detailed description taken in conjunction with the accompanying drawings.

FIG. 1 is a flowchart of a method that can be used with aspects of this disclosure;

FIG. 2 is an image of a damaged blade;

DETAILED DESCRIPTION

Figure 3:
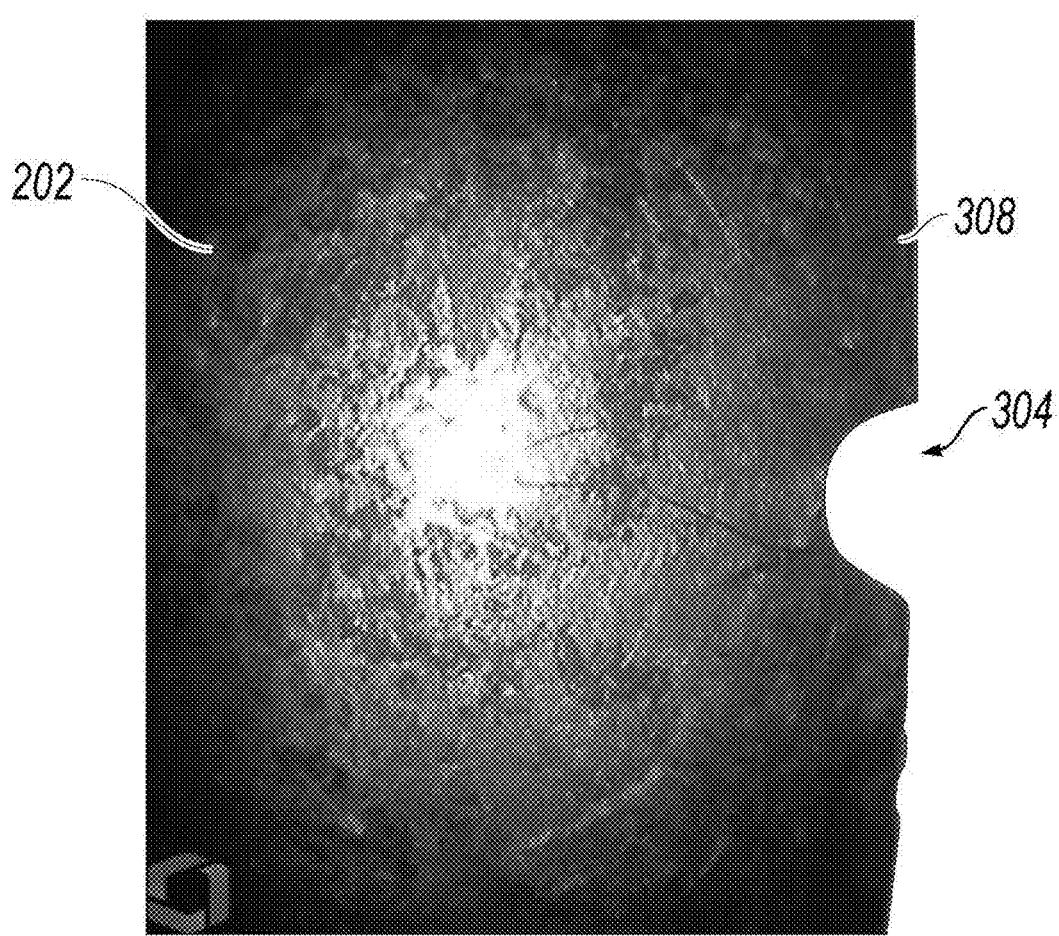
FIG. 3 is an image of a repaired blade.

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

After a repair is performed, a follow-up inspection is often performed to determine an effectiveness of the repair; however, comparing the inspection data gathered before the inspection and the inspection data gathered after the inspection can be difficult. It can be difficult to ensure the camera of the borescope is in the same position and angle for each inspection. In situations such as gas turbine blade inspections, the same blade may be inspected from different access ports. The different camera angles can make assessing repairs difficult.

This disclosure relates to combining both sets of inspection data, before and after repairs, to assess repairs done borescopically. Both sets of data are combined to produce a new set of data. For example, a pre repair image can be combined with a post repair image to produce a combined rendering. Such repairs can include removing material, for example, with a bore grinder, and/or can include adding material, such as with 3D printing or a weld overlay. The combined rendering can then be used to determine a location and size of a defect both before and after a repair operation has taken place. This information can then be provided, for example to an operator or inspector. The operator or inspector can then approve of the repair, recommend additional repair work, or recommend component replacement. The subject matter described herein allows for inspections, repairs, and assessments to be done in situ, without the need to remove components for such activities.

FIG. 1 is a flowchart of an example method 100 that can be used with aspects of this disclosure. At 101, data is received. The data can include information characterizing a first image, such as the image 200 shown in FIG. 2. The data can include information characterizing a second image of the mechanical component after a repair has been performed on the mechanical component, such as the image 300 shown in FIG. 3. In some instances, the repair can include removing material from the component, for example, with a bore grinder. In some instances, the data is acquired from a borescope positioned within a mechanical system, such as a conduit or a gas turbine.

The data can include information characterizing dimensions of a mechanical component before and and/or after the mechanical component has been repaired. Alternatively or in addition, the received data can include multiple 3D surface points that is, coordinates in 3D space representative of the mechanical component. In some implementations, the dimensions or surface points of the mechanical component before the repair and the dimensions or surface points of the component after the repair are derived from a range-finding device. In some implementations, the range finding device emits one or more beams of energy, from an emitter that are then received by a sensor 638 to determine a position of each surface reflecting the one or more beams. For example, in some implementations, light beams or sound beams can be used to determine dimensions of the mechanical component by determining a travel time from the emitter to the sensor. Alternatively or in addition, the range finding device can include an image sensor with stereo vision. As the distance between two lenses within such a sensor is known, the images produced by each image can be compared, and dimensions can be determined based on such a comparison.

At 103, a second set of data is determined based on combining aspects of the received data, for example, the images of the component before and after repair can be combined. The information characterizing dimensions of the mechanical component before and and/or after the mechanical component has been repaired can be combined. Such a set of data can result in a composite image, such as the rendering 400 shown in FIG. 4.

At 105 a location of a defect and a size of the defect, before the repair, as well as a location of the defect and the size of the defect after the repair has been performed on the component, can be determined based on the second set of data.

At 107, the second set of data and the determined location and size of the defect 204 before the repair has been performed on the component and after the repair has been performed on the component is provided. While primarily described in the context of this disclosure as repairing a defect, the subject matter described herein can be applied to any work area, including those that do not include a work defect. For example, in some implementations, providing the second set of data and the determined location and size comprises displaying an image. Example images that can be provided and/or displayed are provided and described throughout this disclosure. Such images can be provided on a screen. In some implementations, the second set of data and the determined location and size of the defect 204 before the repair has been performed on the component 202 and after the repair has been performed on the component 202 can be provided to a database or external storage to be stored for archival purposes or accessed by a separate system for analysis.

For example, as previously mentioned, FIG. 2 is an image of a damaged turbine blade prior to repair. While described primarily in relation to a damaged turbine blade, the subject matter described within this disclosure is applicable to other mechanical components, such as welds. The damage to the component 202 includes a defect 204. The defect 204 defines corners 206 that can cause a stress concentration factor. Such a stress concentration factor can lead to component failure. One remedy for such a defect is to smooth out the corners 206, for example, with a bore grinder. A bore grinder is a radial grinding tool that can be attached to an end of a borescope. Such a device can allow components, such as turbine blades or welds within conduits, to be repaired in situ without the need for dismantling the equipment in which the component 202 resides.

FIG. 3 is an image of a repaired component 202. As can be seen when comparing FIG. 2 and FIG. 3, the corners 206 in the defect 204 have been rounded out, for example, with a bore grinder, to eliminate potential stress concentration factors, resulting in the repaired defect 304. Such an operation can be used to successfully repair the component 202 and return the component 202 into service; however further analysis may need to be performed in some circumstances to ensure the repair has been successful.

Figure 4A:
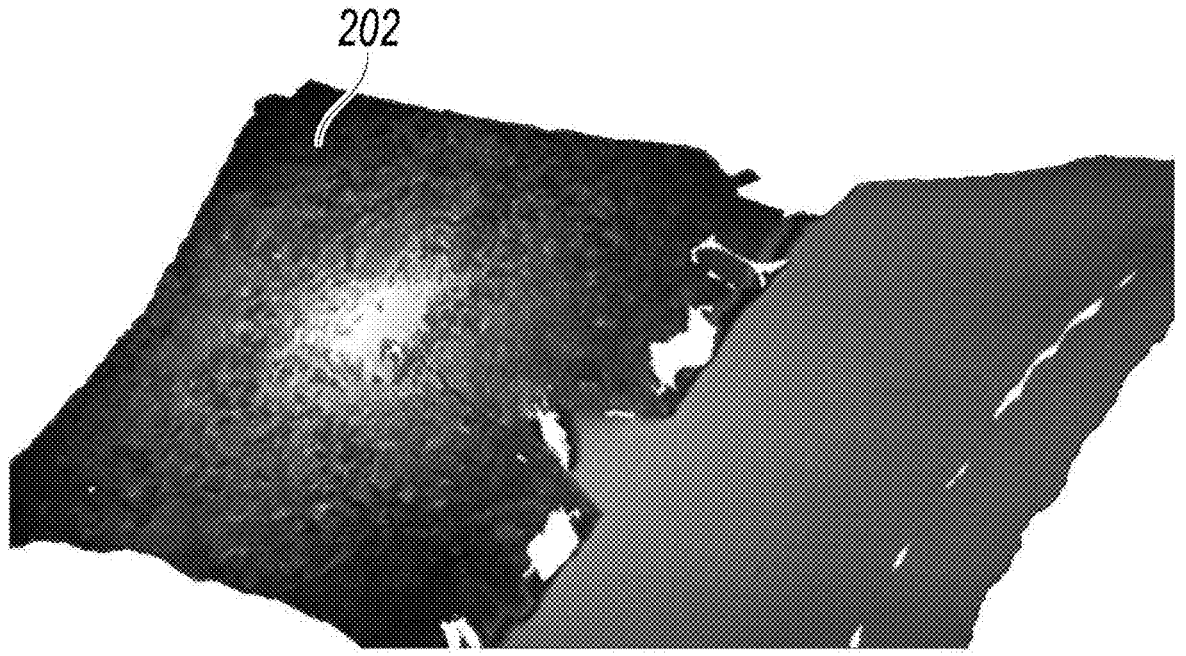
FIG. 4A is a three dimensional rendering of the image of the damaged blade and the repaired blade combined with one another.
Figure 4B:
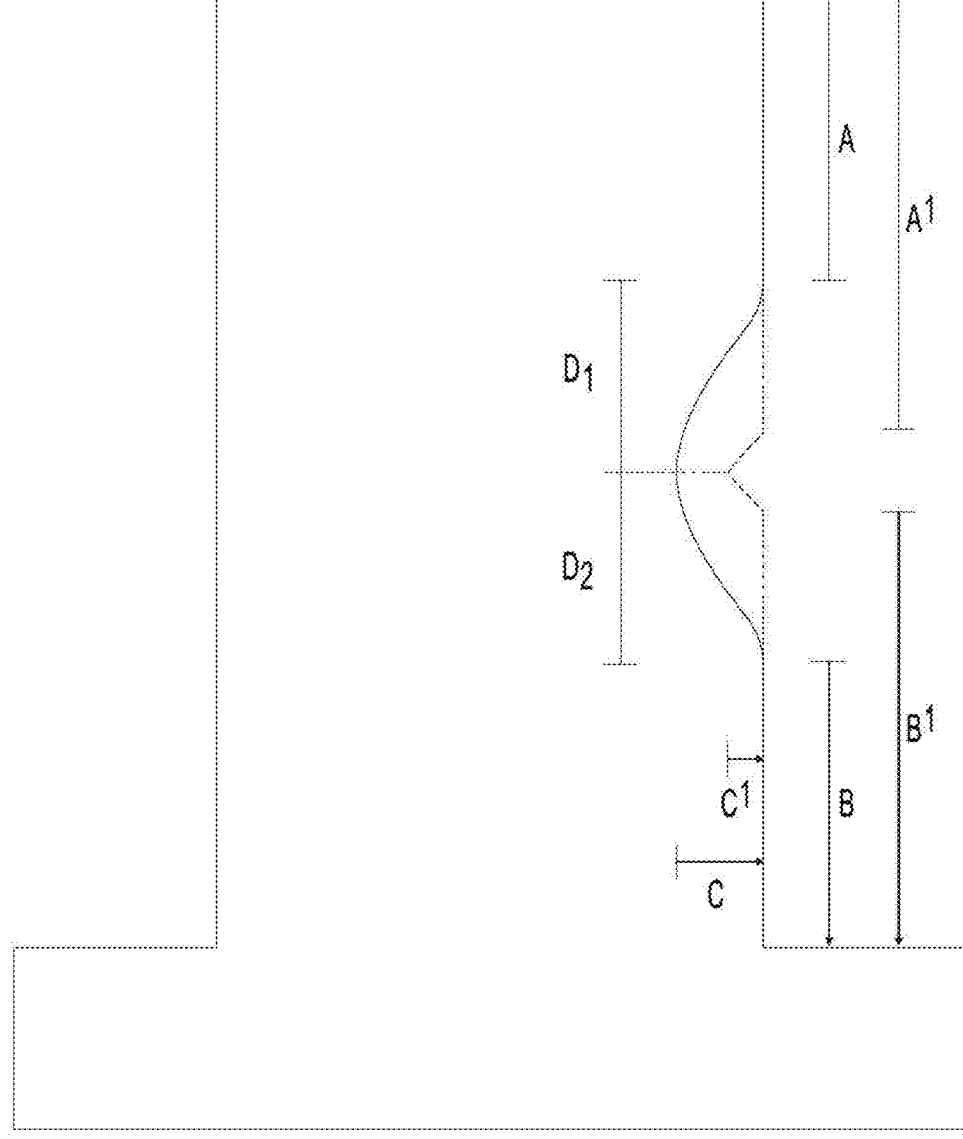
FIG. 4B is a two dimensional rendering of the image of the damaged blade and the repaired blade being combined with one another.

Such an analysis can be done by combining the image 200 and the image 300, for example, a three dimensional rendering 400 shown in FIG. 4A, which is constructed with a combination of the image 200 of the damaged blade and the image 300 of the repaired blade. Alternatively or in addition, a two dimensional rendering 450 can be produced, as shown in FIG. 4B. In some implementations, producing such a rendering is accomplished by at least identifying features within the first image 200 and the second image 300, for example, edge 208 and edge 308. The identified features are then matched between the first image 200 and the second image 300, for example edge 208 and the edge 308 can be identified as a same edge. The images can then be spatially transformed to align with one another to produce a transformed image. For example, edge 208 and edge 308 can be aligned to produce the three dimensional rendering 400 of FIG. 4A and/or the two dimensional rendering 450 of FIG. 4B. Features or other identifying points of the original defect 204 and the repaired defect 304 can be identified and used for such a spatial transformation.

Once the rendering 400 and/or 450 have been produced, a distance between the features indicative of the defect and the features indicative of the edges of the mechanical component can be measured. Such measurements can be used to determine how much material was removed during the repair so that a fitness-for-service indication can be made based on such information. For example as shown in rendering 450, lengths A' and B' can be used to determine an initial width of the defect and C' can be used to determine the depth of the defect. Similarly, lengths A and B and/or lengths $D_1$ and $D_2$ can be used to determine a width of the defect after a repair has been completed. In addition, length C can be used to determine a depth of the defect after a repair has been completed. The total material removed (or added in some instances) can then be determined based on these measured lengths, for example, by comparing the lengths before and after repairs are completed. The fitness-for service indication can be determined based on these measurements and/or the total removed material, for example, by a technician or by the controller 500 as described below.

Figure 5:
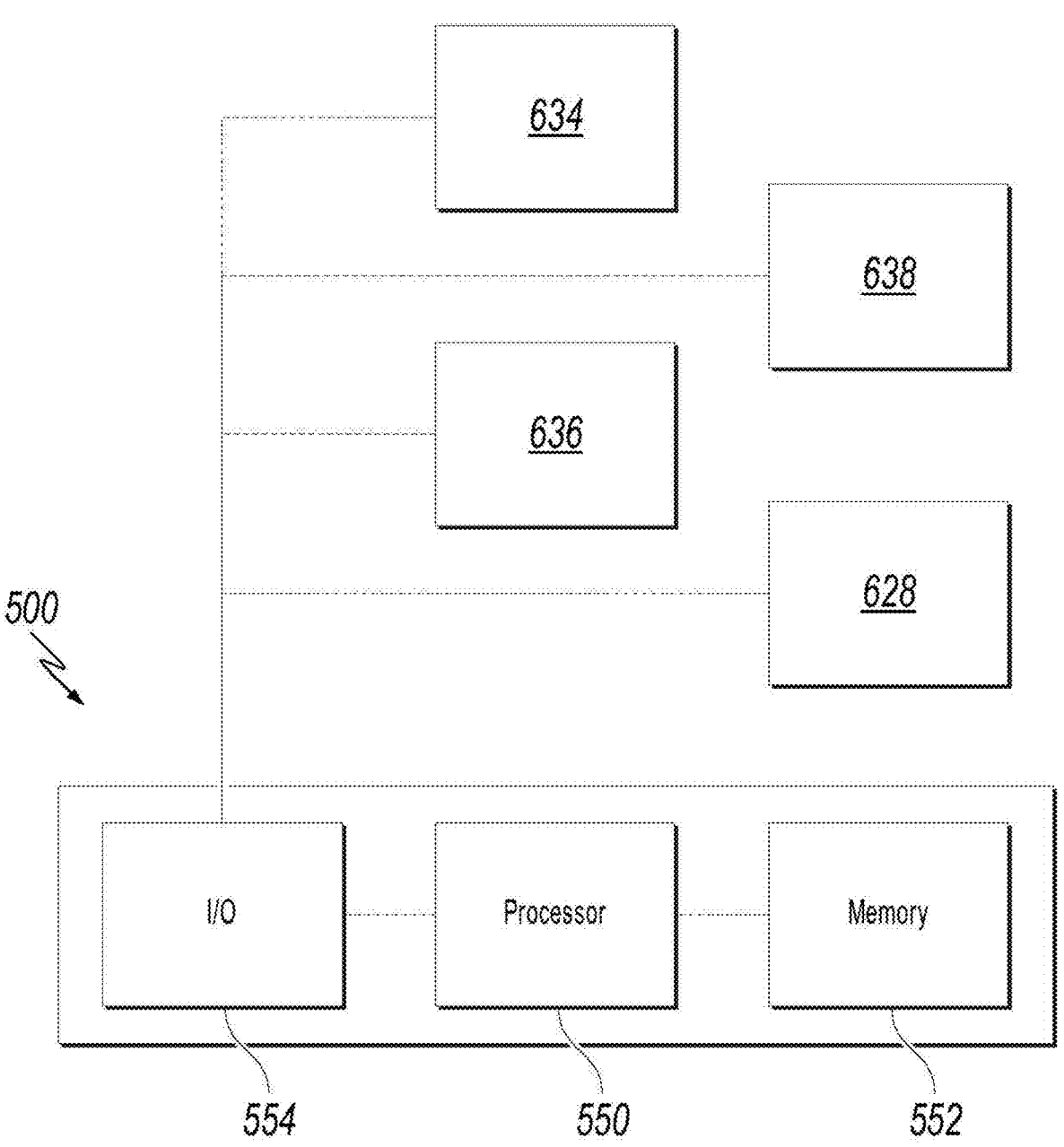
FIG. 5 is a block diagram of an example controller that can be used with aspects of this disclosure.

Determinations and renderings can be performed by a controller 500. Such an example controller is illustrated in FIG. 5. In some embodiments, the controller 500 can execute all or part of the method 100. The controller 500 can, among other things, monitor parameters of a system, send signals to actuate and/or adjust various operating parameters of such systems for example, a borescope 600 (see FIG. 6). As shown in FIG. 5, the controller 500 can include one or more processors 550 and non-transitory computer readable memory storage (e.g., memory 552) containing instructions that cause the processors 550 to perform operations. The processors 550 are coupled to an input/output (I/O) interface 554 for sending and receiving communications with components in the system, including, for example, the emitters 634, the sensors 638, and the camera 636 (see FIG. 6). In certain instances, the controller 500 can additionally communicate status with and send actuation and/or control signals to one or more of the various system components (including, for example, a bendable neck 628) of the system, as well as other sensors (e.g., pressure sensors, temperature sensors, acoustic sensors, vibration sensors and other types of sensors) that provide signals to the system. Other aspects of the method 100 can similarly be performed by the controller with various degrees of autonomy, for example, determining various features from the first image 200 and the second image 300 to produce the rendering 400.

Figure 6:
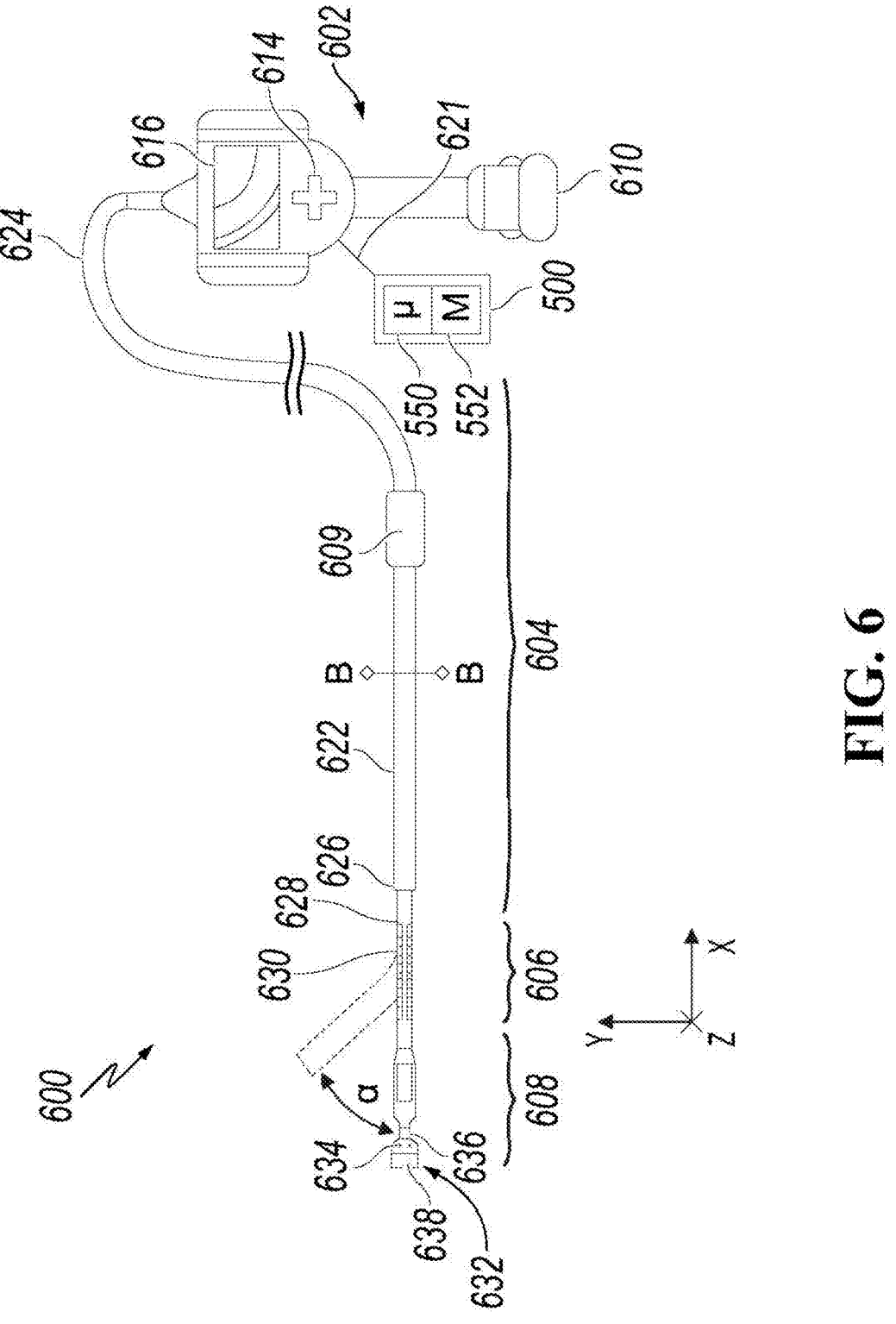
FIG. 6 is a diagram of an example borescope.

FIG. 6 is a diagram of an example borescope 600 that can be used with aspects of this disclosure. The borescope 600 can include a control unit 602 (or controller 500), a conduit section 604, a bendable articulation section 606, and a head section 608. In one embodiment, the sections 604, 606, 608 can have different lengths and can be integral with one another, or can be detachable from one another. As depicted, the conduit section 604 is suitable for insertion into a variety of different targets, such as inside turbomachinery, equipment, pipes, conduits, underwater locations, curves, bends, inside or outside of an aircraft system, and the like.

The borescope 600 can include a probe driver 609 coupled to the conduit section 604. The probe driver 609 can include a motor (not shown) configured to translate and/or rotate one or more of the sections 604, 606, 608 (e.g., to facilitate insertion of the probe head 608 into the target). Additionally or alternatively, orientation/position of a portion of the head section 608 (e.g., camera, light source, etc.) can be varied to acquire an inspection region image (e.g., RGB image, IR image, etc.). The control unit 602 can include a control unit housing 610, a controller 500, a directional input 614, and a screen 616. The controller 500 can include a processor 550 and a readable memory 552 containing computer readable instructions which can be executed by the processor 550 in order to actuate the borescope 600. The computer readable instructions can include an inspection plan based on which the borescope 600 or a portion thereof (e.g., a conduit section 604, a bendable articulation section 606, and a head section 608) can be translated/rotated (e.g., by the probe driver 609). In some implementations, the operation of the probe driver 609 can be based on a control signal (e.g., generated by the controller 500 based on the inspection plan/user input via GUI display space on screen 616 or a computing device, etc.).

The controller 500 can be communicatively coupled to the control unit 602 via one or more signals 621. The controller 500 can also be arranged within the control unit housing 610, or can be arranged outside the control unit housing 610.

On some implementations, the directional input 614 can be configured to receive user input (e.g., direction controls) to the control unit 602 for actuation of the borescope 600. The screen 616 can display visual information being received by the camera (comprising an optical sensor) arranged in the head section 608, which can allow the user to better guide the borescope 600 using the directional input 614. The directional input 614 and the screen 616 can be communicatively coupled to the controller 500 via the one or more signals 621, which can be a hard-wired connection or a wireless signal, such as WI-FI or Bluetooth. In one implementation, inspection data and/or notifications (e.g., notifications based on inspection data as described above) can be provided on the screen 616.

The conduit section 604 can include a tubular housing 622 including a proximal end 624 and a distal end 626. The tubular housing 622 can be a flexible member along its whole length, or can be rigid at the proximal end 624 and become more flexible travelling down the length of the conduit section 604 towards the distal end 626. In certain embodiments, the tubular housing 622 can be formed from a non-porous material to prevent contaminants from entering the borescope 600 via the conduit section 604.

The control unit 602 can be arranged at the proximal end 624 of the tubular housing 622, and the bendable articulation section 606 can be arranged at the distal end of the tubular housing 622. The bendable articulation section 606 can include a bendable neck 628 and washers 630. The bendable neck 628 can be arranged at the distal end 626 of the tubular housing 622, and is able to be actuated 360° in the Y-Z plane. The bendable neck 628 can be wrapped in a non-porous material to prevent contaminants from entering the borescope 600 via the bendable articulation section 606.

The head section 608 can include a head assembly 632. The head assembly 632 can include one or more emitters 634 (e.g., LEDs, acoustic emitters, and/or a fiber optic bundle with lights at the proximal end), a camera 636 (or multiple cameras such as visible-light camera, IR camera, etc.), and one or more sensors 638 that can be configured to collect data about the surrounding environment. The camera 636 of the borescope 600 can provide images and video suitable for inspection to the screen 616 of the control unit 602. The emitters 634 can be used to provide for illumination when the head section 608 is disposed in locations having low light or no light. Alternatively or in addition, the emitters 634 can emit energy beams (e.g., light or sound) to be used for range-finding and distance measurements. The sensor 638 can record data including temperature data, distance data, clearance data (e.g., distance between a rotating element and a stationary element), other spatial or distance measurements, flow data, and so on. Alternatively or in addition, the range finding device can include an image sensor with stereo vision. As the distance between two lenses within such a sensor is known, the images produced by each image can be compared, and dimensions can be determined based on such a comparison.

In certain embodiments, the borescope 600 includes a plurality of replacement head assemblies 632. The head assemblies 632 can include tips having differing optical characteristics, such as focal length, stereoscopic views, 3-dimensional (3D) phase views, shadow views, etc. Additionally or alternatively, the head section 608 can include a removable and replaceable portion of the head section 608. Accordingly, a plurality of the head sections 608, bendable necks 628, and conduit section 604 can be provided at a variety of diameters from approximately one millimeter to ten millimeters or more.

During use, the bendable articulation section 606 and the probe driver 609 can be controlled, for example, by the control inputs (e.g., relative control gestures, physical manipulation device) from the directional input 614 and/or control signals generated by the controller 500. The directional input can be a joystick, D-pad, touch pad, trackball, optical sensor, or a touchscreen over the screen 616. The directional input 614 can also be a similar device that is located outside the control unit housing 610 and connected by wire or wireless means. In particular, a set of control inputs can be used to control the bendable articulation section 606 and/or the probe driver 609. The bendable articulation section 606 can steer or "bend" in various dimensions, while the conduit section 604 can translate and/or rotate, using any combination of actuators and wires arranged within the control unit 602, to adjust the orientation (e.g., a positioning) of the head section 608. In some implementations, the control inputs/direction input 614 can be generated by the controller based on the inspection plan.

The actuators can be electric, pneumatic, or ultrasonically operated motors or solenoids, shape alloy, electroactive polymers, dielectric elastomers, polymer muscle material, or other materials. For example, the bendable articulation section 606 and the probe driver 609 can enable movement of the head section 608 in an X-Y plane, X-Z plane, and/or Y-Z plane. Indeed, the directional input 614 can be used to perform control actions suitable for disposing the head section 608 at a variety of angles, such as the depicted angle α. In this manner, the head section 608 can be positioned to visually inspect desired locations.

Once the head section 608 is in a desired position, the camera 636 can operate to acquire, for example, a stand-still visual image or a continuous visual image, which can be displayed on the screen 616 of the control unit 602, and can be recorded by the borescope 600. In embodiments, the screen 616 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:

receiving data characterizing a first image and plurality of 3D surface points characterizing a mechanical component before a repair has been performed on the mechanical component, and a second image and plurality of 3D surface points characterizing the mechanical component after a repair has been performed on the mechanical component, wherein the repair comprises removing material from, or adding material to, the component, wherein the first and second images are acquired using an image sensor, and the 3D surface points characterizing the mechanical component before and after the repair are derived from images acquired using the image sensor;

determining a second set of data based on combining the received data, the second set of data characterizing an image and dimensions of the mechanical component before and after a repair has been performed on the component, wherein determining the second set of data comprises:

determining a 3D transformation to align the mechanical component as characterized by the first plurality of 3D surface points and the mechanical component as characterized by the second plurality of 3D surface points;

determining a first plurality of aligned 3D surface points and a second plurality of aligned 3D surface points using the 3D transformation identifying features within the first image and the second image;

matching the features between the first image and the second image;

determining a 3D transformation matrix, wherein determining the first plurality of aligned 3D surface points and the second plurality of aligned 3D surface points using the 3D transformation comprises multiplying the 3D transformation matrix with the first or second plurality of 3D surface points; and spatially transforming the first image to align with the second image, producing a transformed image;

determining a location of a work area and a size of the work area before the repair has been performed on the component and after the repair has been performed on the component, based on the second set of data; and providing the second set of data and the determined location and size of the work area before the repair has been performed on the component and after the repair has been performed on the component.

2. The method of claim 1, further comprising repairing the mechanical component.

3. The method of claim 1, wherein the mechanical component includes a turbine blade or a weld.

4. The method of claim 1, wherein receiving the data comprises:

acquiring the data from a borescope positioned within a mechanical system.

5. The method of claim 1, wherein identifying features within the first image and the second image comprises identifying points indicative of the work area, wherein determining the location and the size comprises:

identifying features indicative of edges of the mechanical component; and measuring a distance between the features indicative of the work area and the features indicative of the edges of the mechanical component.

6. The method of claim 5, wherein measuring a distance comprises measuring a plurality of distances, the method further comprising:

comparing the plurality of measured distances between the mechanical component before the repair and the mechanical component after repair;

determine an amount of material added or removed during the repair based on the comparison; and provide the determined amount of material added or removed.

7. The method of claim 1, wherein providing the second set of data and the determined location and size comprises displaying an image.

8. A system comprising:

at least one data processor; and non-transitory memory storing instructions, which, when executed by the at least one data processor causes the at least one data processor to perform operations comprising:

receiving data characterizing a first image and plurality of 3D surface points characterizing a mechanical component before a repair has been performed on the mechanical component, and a second image and plurality of 3D surface points characterizing the mechanical component after a repair has been performed on the mechanical component, wherein the repair comprises removing material from, or adding material to, the component, wherein the first and second images are acquired using an image sensor, and the 3D surface points characterizing the mechanical component before and after the repair are derived from images acquired using the image sensor;

determining a second set of data based on combining the received data, the second set of data characterizing an image and dimensions of the mechanical component before and after a repair has been performed on the component, wherein determining the second set of data comprises:

determining a 3D transformation to align the mechanical component as characterized by the first plurality of 3D surface points and the mechanical component as characterized by the second plurality of 3D surface points;

determining a first plurality of aligned 3D surface points and a second plurality of aligned 3D surface points using the 3D transformation identifying features within the first image and the second image;

matching the features between the first image and the second image;

determining a 3D transformation matrix, wherein determining the first plurality of aligned 3D surface points and the second plurality of aligned 3D surface points using the 3D transformation comprises multiplying the 3D transformation matrix with the first or second plurality of 3D surface points; and spatially transforming the first image to align with the second image, producing a transformed image;

determining a location of a work area and a size of the work area before the repair has been performed on the component and after the repair has been performed on the component, based on the second set of data; and providing the second set of data and the determined location and size of the work area before the repair has been performed on the component and after the repair has been performed on the component.

9. The system, of claim 8, wherein the mechanical component comprises a turbine blade.

10. The system, of claim 8, wherein the mechanical component comprises a weld.

11. The system of claim 8, wherein receiving the data comprises:

acquiring the data from a borescope positioned within a mechanical system.

12. The system of claim 8, wherein identifying features within the first image and the second image comprises identifying points indicative of the work area, wherein determining the location and the size comprises:

identifying features indicative of edges of the mechanical component; and measuring a distance between the features indicative of the work area and the features indicative of the edges of the mechanical component.

13. The system of claim 8, wherein providing the second set of data and the determined location and size comprises displaying an image.

14. A non-transitory computer readable memory storing instructions which, when executed by at least one data processor forming part of at least one computing system, causes the at least one data processor to perform operations comprising:

receiving data characterizing a first image and plurality of 3D surface points characterizing a mechanical component before a repair has been performed on the mechanical component, and a second image and plurality of 3D surface points characterizing the mechanical component after a repair has been performed on the mechanical component, wherein the repair comprises removing material from, or adding material to, the component, wherein the first and second images are acquired using an image sensor, and the 3D surface points characterizing the mechanical component before and after the repair are derived from images acquired using the image sensor;

determining a second set of data based on combining the received data, the second set of data characterizing an image and dimensions of the mechanical component before and after a repair has been performed on the component, wherein determining the second set of data comprises:

determining a 3D transformation to align the mechanical component as characterized by the first plurality of 3D surface points and the mechanical component as characterized by the second plurality of 3D surface points;

determining a first plurality of aligned 3D surface points and a second plurality of aligned 3D surface points using the 3D transformation identifying features within the first image and the second image;

matching the features between the first image and the second image;

determining a 3D transformation matrix, wherein determining the first plurality of aligned 3D surface points and the second plurality of aligned 3D surface points using the 3D transformation comprises multiplying the 3D transformation matrix with the first or second plurality of 3D surface points; and spatially transforming the first image to align with the second image, producing a transformed image;

determining a location of a work area and a size of the work area before the repair has been performed on the component and after the repair has been performed on the component, based on the second set of data; and providing the second set of data and the determined location and size of the work area before the repair has been performed on the component and after the repair has been performed on the component.

15. The non-transitory computer readable memory of claim 14, wherein the mechanical component includes a turbine blade or a weld.

16. The non-transitory computer readable memory of claim 14, wherein receiving the data comprises:

acquiring the data from a borescope positioned within a mechanical system.

* * * * *